(12) United States Patent
Wu

(10) Patent No.: US 6,427,581 B1
(45) Date of Patent: Aug. 6, 2002

(54) WAFFLE MAKER WITH COOKING TEMPERATURE CONTROL

(75) Inventor: Tsan-Kuen Wu, Tainan Hsien (TW)

(73) Assignee: Tsann Kuen USA Inc., Pasedena, CA (US)

( * ) Notice: Subject to any disclaimer, the term of this patent is extended or adjusted under 35 U.S.C. 154(b) by 0 days.

(21) Appl. No.: 10/028,628

(22) Filed: Dec. 20, 2001

(51) Int. Cl.[7] .................. A47J 37/00; A47J 37/06; A47J 37/08; A23L 1/00; H05B 3/06

(52) U.S. Cl. .................. 99/332; 99/331; 99/342; 99/344; 99/372; 99/374; 99/375; 99/378

(58) Field of Search .................. 99/326–333, 342–344, 99/372–384, 385, 389–391, 400, 401, 444–446; 219/521, 524, 525, 537, 492, 494, 497

(56) References Cited

U.S. PATENT DOCUMENTS

| | | | | |
|---|---|---|---|---|
| 1,609,317 A | * | 12/1926 | Smith | 99/377 |
| 1,708,499 A | * | 4/1929 | Filbey | 99/377 |
| 1,879,010 A | * | 9/1932 | Antrim | 99/377 |
| 1,954,235 A | * | 4/1934 | Becker | 99/378 X |
| 2,116,688 A | * | 5/1938 | Ratliff | 99/377 |
| 2,478,529 A | * | 8/1949 | Farr et al. | 219/524 X |
| 2,765,727 A | * | 10/1956 | Lipsich et al. | 219/525 X |
| 3,236,998 A | * | 2/1966 | Wertheimer et al. | 219/524 X |
| 3,245,337 A | * | 4/1966 | White et al. | 99/331 X |
| 3,377,942 A | * | 4/1968 | Carbon | 99/376 |
| 3,848,110 A | * | 11/1974 | Giguere et al. | 219/525 X |
| 3,852,569 A | * | 12/1974 | Potvin | 99/425 X |
| 4,027,139 A | * | 5/1977 | Theimer | 219/525 X |

* cited by examiner

Primary Examiner—Timothy F. Simone
(74) Attorney, Agent, or Firm—Harness, Dickey & Pierce, P.L.C.

(57) ABSTRACT

A waffle maker includes upper and lower waffle grids coupled to each other and configured to confine a cooking space when closed together. The cooking space is adapted to receive batter therein. An electric heater unit is operable so as to heat and cook the batter in the cooking space for making a waffle. A temperature control circuit controls heating operation of the electric heater unit, and includes a heater controller for controlling supply of electric power to the electric heater unit, a sensor unit for detecting cooking temperature in the cooking space and for generating a sensor output corresponding to the cooking temperature, a user input unit operable so as to provide a cooking temperature setting, and a processor unit for controlling operation of the heater controller in accordance with the sensor output from the sensor unit and the cooking temperature setting from the user input unit.

20 Claims, 3 Drawing Sheets

WAFFLE MAKER WITH COOKING TEMPERATURE CONTROL

BACKGROUND OF THE INVENTION

1. Field of the Invention

The invention relates to a waffle maker, more particularly to a waffle maker that permits electronic control of the cooking temperature.

2. Description of the Related Art

A conventional waffle maker has a pair of waffle grids that are configured to confine a cooking space when closed together. Each of the waffle grids is associated with a respective electric heater. As such, when electric power is supplied to the electric heaters of the waffle grids, batter in the cooking space will be heated to a predetermined cooking temperature, thereby making a waffle.

In the conventional waffle maker, a thermostat is employed to control the supply of electric power to the electric heaters. The thermostat is usually a bimetallic strip with different temperature expansion coefficients, and is capable of making and breaking electrical connection to control the cooking temperature to within a predetermined range, such as 140±10° C. Particularly, when the bimetallic thermostat is in use, full power (e.g. 1000 watts) is continuously supplied to the electric heaters until the cooking temperature rises to the predetermined value. The waffle is cooked and is ready for consumption at this time.

A main drawback of the aforesaid conventional waffle maker that utilizes the bimetallic thermostat for temperature control resides in that the crispness of the waffles made thereby cannot be varied as desired by the consumer.

SUMMARY OF THE INVENTION

Therefore, the main object of the present invention is to provide a waffle maker that permits electronic control of the cooking temperature so as to overcome the aforesaid drawback of the prior art.

According to the present invention, a waffle maker comprises upper and lower waffle grids, an electric heater unit, and a temperature control circuit.

The upper and lower waffle grids are coupled to each other and are configured to confine a cooking space when closed together. The cooking space is adapted to receive batter therein.

The electric heater unit is associated with the waffle grids and is operable so as to heat and cook the batter in the cooking space for making a waffle.

The temperature control circuit is connected to the electric heater unit for controlling heating operation of the same. The temperature control circuit includes a heater controller, a sensor unit, a user input unit and a processor unit. The heater controller is connected to the electric heater unit and is adapted to be connected to a power supply. The heater controller is operable so as control supply of electric power to the electric heater unit. The sensor unit is adapted to detect cooking temperature in the cooking space and to generate a sensor output corresponding to the cooking temperature detected thereby. The user input unit is operable so as to provide a cooking temperature setting. The processor unit is connected to the heater controller, the sensor unit and the user input unit. The processor unit controls operation of the heater controller in accordance with the sensor output from the sensor unit and the cooking temperature setting from the user input unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
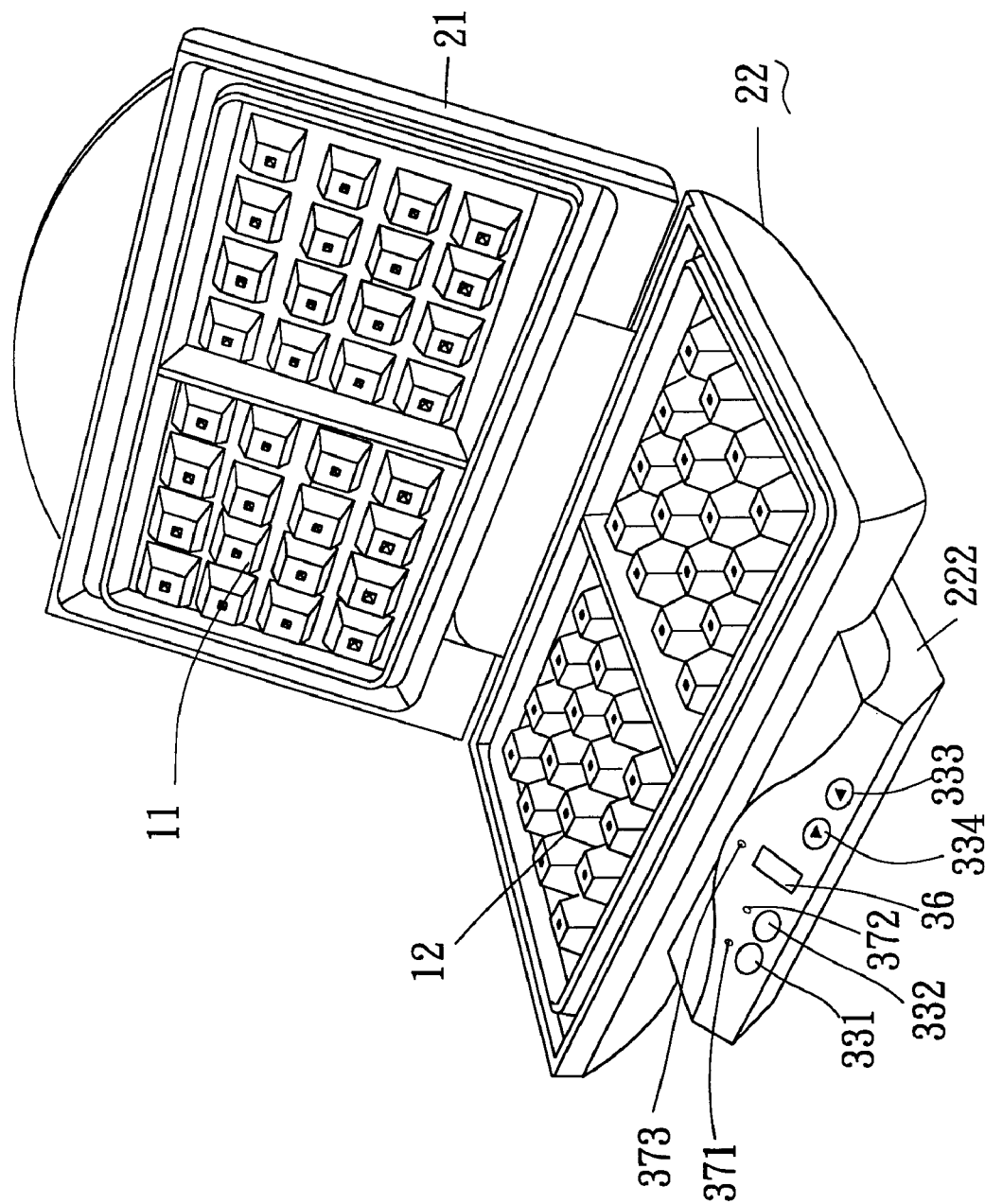
FIG. 1 is a perspective view of the preferred embodiment of a waffle maker according to the present invention.
Figure 2:
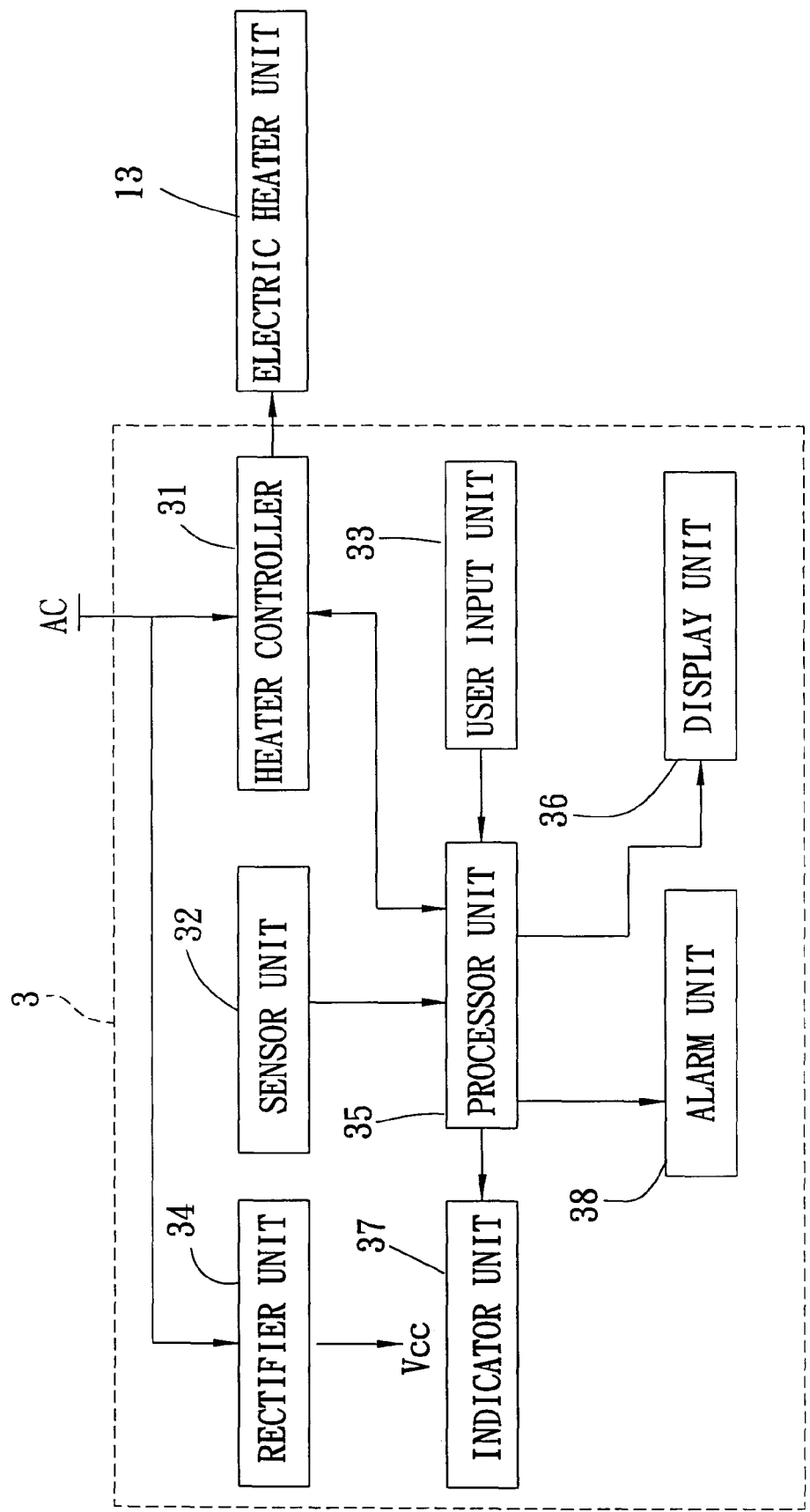
FIG. 2 is a schematic circuit block diagram illustrating a temperature control circuit of the preferred embodiment.

Referring to FIGS. 1 and 2, the preferred embodiment of a waffle maker according to the present invention is shown to comprise upper and lower waffle grids 11, 12 that have rear ends coupled pivotally to each other and that are configured to confine a cooking space when closed together. The cooking space is adapted to receive batter therein. Each of the waffle grids 11, 12 is associated with a respective electric heater (not shown) The electric heaters constitute an electric heater unit 13 (see FIG. 2). When electric power is supplied to the electric heater unit 13, batter in the cooking space will be heated to a predetermined cooking temperature, thereby making a waffle. Each of the waffle grids 11, 12 is provided with a housing 21, 22 at an outer side thereof. The housing 22 of the lower waffle grid 12 has a protruding part 222. A temperature control circuit 3 can be mounted in the housing 21, 22 of either of the upper and lower waffle grids 11, 12, and is used to control the heating operation of the electric heater unit 13. In this embodiment, the temperature control circuit 3 is mounted in the protruding part 222 of the housing 22 of the lower waffle grid 12.

Figure 3:
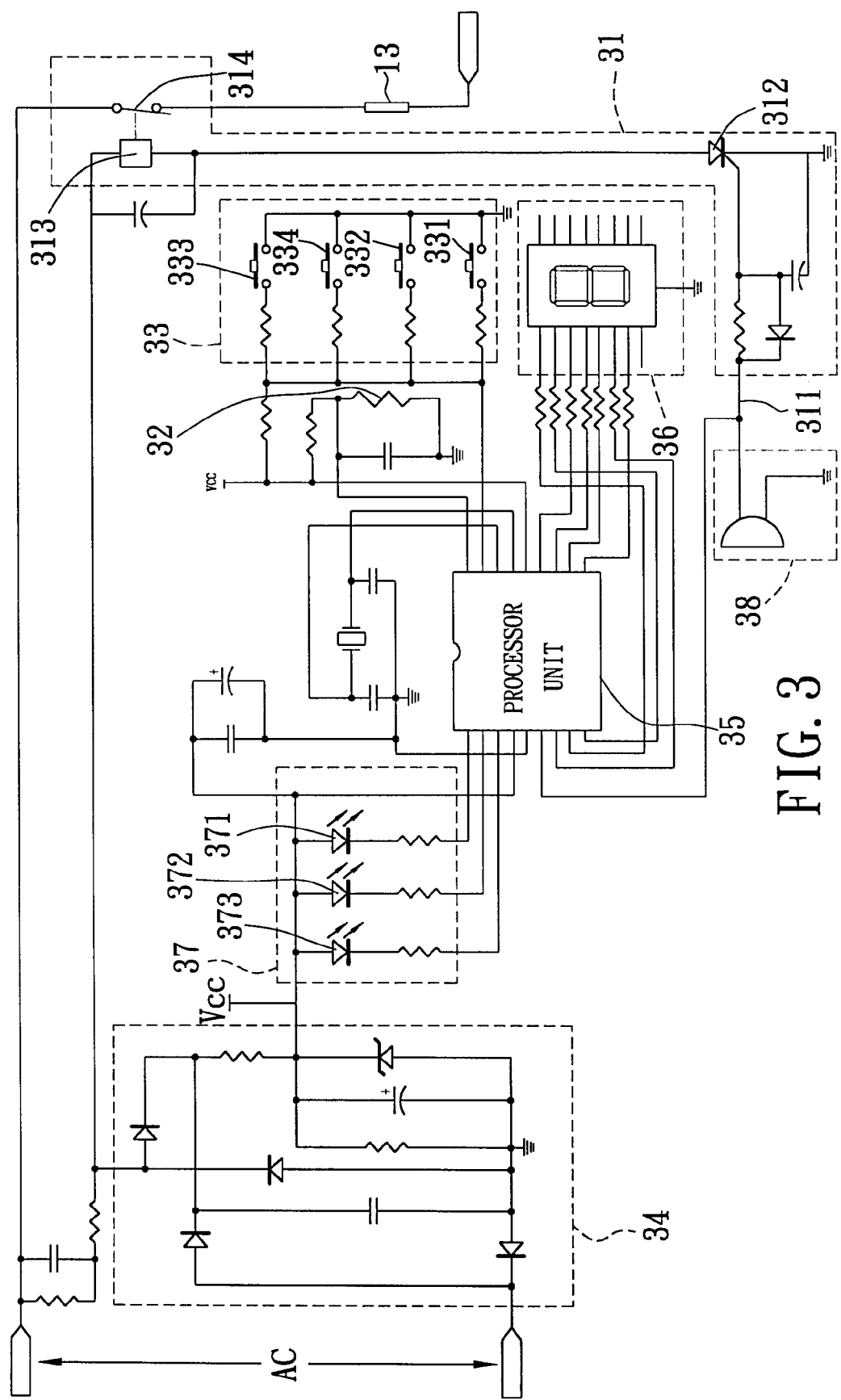
FIG. 3 is a schematic electrical circuit diagram of the temperature control circuit of the preferred embodiment.

With further reference to FIG. 3, the temperature control circuit 3 includes a heater controller 31 connected to the electric heater unit 13 and operable so as to control the supply of an alternating current (AC) voltage from an AC power source to the electric heater unit 13, a sensor unit 32 for generating a sensor output corresponding to the cooking temperature in the cooking space, a user input unit 33 which is manually operable so as to provide a cooking temperature setting, a rectifier unit 34 for rectifying the AC voltage from the AC power source so as to generate a direct current voltage (Vcc) that serves as a DC power source for the temperature control circuit 3, a processor unit 35 which is connected to the heater controller 31, the sensor unit 32 and the user input unit 33, and which controls operation of the heater controller 31 in accordance with the sensor output from the sensor unit 32 and the cooking temperature setting from the user input unit 33, a display unit 36 connected to and controlled by the processor unit 35 so as to provide a visual indication of the cooking temperature setting, and an indicator unit 37 and an alarm unit 38 which are connected to and controlled by the processor unit 35.

The heater controller 31 has a control input 311 connected to the processor unit 35, and includes a thyristor 312, in the form of a silicon-controlled rectifier (SCR), and a relay 313 connected in series to the thyristor 312. When the gate terminal of the thyristor 312 receives a low logic input from the processor unit 35 via the control input 311, the thyristor 312 will remain in a non-conducting state such that electric current will be unable to flow through the relay 313. The relay 313 is de-energized, and a normally closed switch 314 of the relay 313 connects the AC power source to the electric heater unit 13 at this time. Accordingly, when the gate terminal of the thyristor 312 receives a high logic input from the processor unit 35 via the control input 311, the thyristor 312 will conduct such that electric current will be able to flow through the relay 313. The relay 313 is energized, and the normally closed switch 314 of the relay 313 disconnects the AC power supply from the electric heater unit 13.

The sensor unit 32 is disposed in either of the upper and lower waffle grids 11, 12 so as to detect the cooking temperature in the cooking space. The sensor output of the sensor unit 32 is provided to the processor unit 35. In this embodiment, the sensor unit 32 is disposed in the housing 22 of the lower waffle grid 12, and is in the form of a negative temperature coefficient (NTC) thermistor.

The user input unit 33 includes a set of push button keys mounted on a top side of the protruding part 222 of the housing 22 of the lower waffle grid 12. The push button keys include a power control key 331, a power select key 332, and up-and-down temperature adjust keys 333, 334. The power control key 331 is operated to control activation and deactivation of the temperature control circuit 3. The power select key 332 is operated to control the supply of full power or partial power to the electric heater unit 13. Particularly, when the power select key 332 is in a first state, the processor unit 35 is enabled such that full power is supplied to the electric heater unit 13 via the heater controller 31. When the power select key 332 is in a second state, the processor unit 35 is enabled such that partial power less than the full power is supplied to the electric heater unit 13 via the heater controller 31. The temperature adjust keys 333, 334 are operable so as to adjust a current cooking temperature setting. In this embodiment, the cooking temperature can be controlled by the processor unit 35 to be within the range of 140° C. to 205° C. The processor unit 35 has a set of six predetermined cooking temperatures, i.e. 140° C., 153° C., 166° C., 179° C., 192° C. and 205° C., stored therein. The temperature adjust keys 333, 334 are operable so as to select the cooking temperature setting from the set of predetermined cooking temperatures in the processor unit 35. It should be noted that instead of using two keys 333, 334, a single temperature adjust key in a ring-type temperature selector configuration can be employed to achieve the same effect.

The processor unit 35 is programmed to compare the sensor output from the sensor unit 32 with the cooking temperature setting from the user input unit 33, and controls operation of the heater controller 31 in accordance with the result of the comparison so that the cooking temperature can be controlled to reach the cooking temperature setting. For example, when the user input unit 33 is operated so as to select the third predetermined cooking temperature, e.g. 166° C., for making a waffle, as long as the sensor unit 32 detects that the cooking temperature in the cooking space has yet to reach 166° C., the processor unit 35 will control the heater controller 31 such that the AC voltage from the AC power source is continuously supplied to the electric heater unit 13. Upon detection by the sensor unit 32 that the cooking temperature in the cooking space has reached 166° C., the processor unit 35 will control the heater controller 31 to interrupt the supply of the AC voltage from the AC power source to the electric heater unit 13. In this way, the cooking temperature can be ensured to reach the vicinity of 166° C., preferably 166±5° C.

In the preferred embodiment, partial power is supplied to the electric heater unit 13 by enabling the processor unit 35 to control the heater controller 31 so as to permit electric current to flow intermittently through the electric heater unit 13. More particularly, the processor unit 35 activates the heater controller 31 periodically to conduct electric current through the electric heater unit 13 for a first time period, such as 6 seconds, and to interrupt the electric current through the electric heater unit 13 for a second time period, such as 4 seconds. Assuming that full power to the electric heater unit 13 is 1000 watts, the electric power supplied to the electric heater unit 13 under the aforesaid partial power operating conditions is about 500 watts. It is noted that, when partial power is supplied to the electric heater unit 13, the time required to reach the cooking temperature setting will be longer. As such, the crispness of waffles made by the waffle maker of this invention during the supply of full power and partial power to the electric heater unit 13 can vary.

The display unit 36 is mounted on the top side of the protruding part 222 of the housing 22 of the lower waffle grid 12. In this embodiment, the display unit 36 is a seven-segment light emitting diode (LED) display that is controlled by the processor unit 35 so as to provide a visual indication of the cooking temperature setting. For example, when the third predetermined cooking temperature is selected after operating the power control key 331, the display unit 36 shows the number "3" thereon. Preferably, the display unit 36 is controlled by the processor unit 35 to show a dash thereon when the waffle maker is connected to the AC power supply and the power control key 331 is yet to be operated to activate the temperature control circuit 3, thereby indicating that a cooking temperature setting has not yet been inputted and that the electric heater unit 13 is in a non-operative state.

The indicator unit 37 is mounted on the top side of the protruding part 222 of the housing 22 of the lower waffle grid 12, and includes a power status indicator lamp 371, a power select indicator lamp 372 and a preheating indicator lamp 373.

The power status indicator lamp 371 is used to indicate whether or not the temperature control circuit 3 is in an activated state. In other words, even when the waffle maker is connected to the AC power supply, as long as the power control key 331 is yet to be operated, the processor unit 35 disables the power status indicator lamp 371. The power status indicator lamp 371 is enabled by the processor unit 35 only after the power control key 331 is operated to activate the temperature control circuit 3.

The power select indicator lamp 372 is used to indicate whether full power or partial power is supplied to the electric heater unit 13. In this embodiment, when the power select key 332 is operated to select the supply of partial power to the electric heater unit 13, the processor unit 35 disables the power select indicator lamp 372. Accordingly, when the power select key 332 is operated to select the supply of full power to the electric heater unit 13, the processor unit 35 enables the power select indicator lamp 372.

The preheating indicator lamp 373 is used to indicate whether the cooking space is ready to receive batter therein. In the preferred embodiment, with reference to the sensor output from the sensor unit 32, upon detection by the processor unit 35 that the cooking space has been preheated to a preset preheating temperature, such as 140° C., the processor unit 35 will enable the preheating indicator lamp 373 to indicate that the cooking space has been preheated and is ready to receive the batter therein.

In the preferred embodiment, the alarm unit 38 includes a buzzer and is activated by the processor unit 35 to generate an audible alarm output when cooking of the waffle has been completed. Particularly, with reference to the sensor output from the sensor unit 32, upon detection by the processor unit 35 that the cooking temperature in the cooking space has reached the cooking temperature setting, the processor unit 35 activates the alarm unit 38 simultaneous with control of the heater controller 31 to interrupt the supply of the AC voltage from the AC power supply to the electric heater unit 13.

It has thus been shown that, due to the provision of the temperature control circuit 3, electronic control of the cooking temperature is possible in the waffle maker of this invention. In addition, because the user can adjust the cooking temperature setting and has the option of supplying full power or partial power to the electric heater unit 13, the waffle maker of this invention can be used to make waffles having crispness that can vary as desired.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A waffle maker comprising:
   upper and lower waffle grids coupled to each other and configured to confine a cooking space when closed together, said cooking space being adapted to receive batter therein;
   an electric heater unit associated with said upper and lower waffle grids and operable so as to heat and cook the batter in said cooking space for making a waffle; and
   a temperature control circuit connected to said electric heater unit for controlling heating operation of said electric heater unit, said temperature control circuit including
      a heater controller connected to said electric heater unit and adapted to be connected to a power supply, said heater controller being operable so as control supply of electric power to said electric heater unit,
      a sensor unit adapted to detect cooking temperature in said cooking space and to generate a sensor output corresponding to the cooking temperature detected thereby,
      a user input unit operable so as to provide a cooking temperature setting, and
      a processor unit connected to said heater controller, said sensor unit and said user input unit, said processor unit controlling operation of said heater controller in accordance with the sensor output from said sensor unit and the cooking temperature setting from said user input unit.

2. The waffle maker as claimed in claim 1, wherein said heater controller includes a thyristor connected to said processor unit, and a relay connected to said thyristor and adapted to connect said electric heater unit to the power supply, said processor unit controlling conduction and non-conduction of said thyristor to control in turn energizing and de-energizing of said relay, thereby controlling connection of said electric heater unit to the power supply.

3. The waffle maker as claimed in claim 2, wherein said thyristor includes a silicon-controlled rectifier.

4. The waffle maker as claimed in claim 1, wherein said sensor unit includes a negative temperature coefficient thermistor.

5. The waffle maker as claimed in claim 1, wherein said processor unit compares the sensor output with the cooking temperature setting, and controls said heater controller to control in turn supply of the electric power to said electric heater unit such that the cooking temperature can be controlled to reach the cooking temperature setting.

6. The waffle maker as claimed in claim 5, wherein said processor unit controls said heater controller to supply the electric power to said electric heater unit when the cooking temperature has yet to reach the cooking temperature setting, and to interrupt the supply of the electric power to said electric heater unit when the cooking temperature has reached the cooking temperature setting.

7. The waffle maker as claimed in claim 1, wherein said user input unit includes a power control key for controlling activation and deactivation of said temperature control circuit, and a power status indicator lamp connected to and enabled by said processor unit to indicate an activated state of said temperature control circuit.

8. The waffle maker as claimed in claim 1, wherein said user input unit includes a power select key for enabling said processor unit to control supply of full power to said electric heater unit via said heater controller when in a first state, and for enabling said processor unit to control supply of partial power less than the full power to said electric heater unit via said heater controller when in a second state.

9. The waffle maker as claimed in claim 8, wherein said processor unit controls said heater controller to permit electric current to flow intermittently through said electric heater unit when said power select key is in the second state.

10. The waffle maker as claimed in claim 8, wherein said processor unit activates the heater controller periodically to conduct electric current through said electric heater unit for a first time period, and to interrupt the electric current through said electric heater unit for a second time period when said power select key is in the second state.

11. The waffle maker as claimed in claim 10, wherein the first time period is 6 seconds and the second time period is 4 seconds.

12. The waffle maker as claimed in claim 8, wherein said temperature control circuit further includes a power select indicator lamp connected to and enabled by said processor unit to indicate the supply of full power to said electric heater unit.

13. The waffle maker as claimed in claim 1, wherein said processor unit has a set of predetermined cooking temperatures stored therein.

14. The waffle maker as claimed in claim 13, wherein said user input unit includes at least one temperature adjust key operable so as to select the cooking temperature setting from said set of predetermined cooking temperatures stored in said processor unit.

15. The waffle maker as claimed in claim 1, wherein said user input unit includes at least one temperature adjust key operable so as to adjust a current cooking temperature setting.

16. The waffle maker as claimed in claim 1, wherein said temperature control circuit further includes a display unit connected to and controlled by said processor unit so as to provide a visual indication of the cooking temperature setting.

17. The waffle maker as claimed in claim 1, wherein said temperature control circuit further includes a preheating indicator lamp connected to and enabled by said processor unit upon detection by said processor unit that said cooking space has been preheated to a preset preheating temperature to indicate that said cooking space is ready to receive the batter therein.

18. The waffle maker as claimed in claim 1, wherein said temperature control circuit further includes an alarm unit connected to and activated by said processor unit to generate an alarm output when cooking of the waffle has been completed.

19. The waffle maker as claimed in claim 18, wherein said processor unit activates said alarm unit upon detection that the cooking temperature in said cooking space has reached the cooking temperature setting.

20. The waffle maker as claimed in claim 18, wherein said alarm unit includes a buzzer.

* * * * *